US00RE48132E

(19) United States
(12) Reissued Patent
Yang

(10) Patent Number: US RE48,132 E
(45) Date of Reissued Patent: Jul. 28, 2020

(54) OPERATING METHOD, APPARATUS AND SYSTEM FOR MEDIA STREAM TRANSMISSION KEY

(71) Applicant: Huawei Technologies Co., Ltd., Shenzhen, Guangdong (CN)

(72) Inventor: Weiwei Yang, Xi'an (CN)

(73) Assignee: Huawei Technologies Co., Ltd., Shenzhen (CN)

(21) Appl. No.: 15/692,949

(22) Filed: Aug. 31, 2017

Related U.S. Patent Documents

Reissue of:
(64) Patent No.: 9,130,961
Issued: Sep. 8, 2015
Appl. No.: 13/489,872
Filed: Jun. 6, 2012

U.S. Applications:
(63) Continuation of application No. PCT/CN2010/070637, filed on Feb. 11, 2010.

(51) Int. Cl.
*H04L 29/06* (2006.01)
*H04L 29/08* (2006.01)

(52) U.S. Cl.
CPC ..... *H04L 65/1043* (2013.01); *H04L 63/068* (2013.01); *H04L 63/108* (2013.01); *H04L 65/608* (2013.01); *H04L 67/145* (2013.01)

(58) Field of Classification Search
CPC . H04L 65/1043; H04L 63/068; H04L 63/108; H04L 64/608; H04L 67/145
See application file for complete search history.

(56) References Cited

U.S. PATENT DOCUMENTS 7,492,899 B2 2/2009 Qiao et al.
7,581,100 B2 8/2009 Mizrah
(Continued)

FOREIGN PATENT DOCUMENTS

CN 1490973 A 4/2004
CN 1571407 A 1/2005
(Continued)

OTHER PUBLICATIONS

Juniper Networks, "H.248.SRTP-Proposed initial draft for a new H.248 work item: SRTP Package and Procedures," International Telecommunication Union, Telecommunication Standardization Sector, Study Period 2009-2012, Study Group 16—Contribution 338, Oct. 2009, XP017452321, total 12 pages.
(Continued)

*Primary Examiner* — Woo H. Choi
(74) *Attorney, Agent, or Firm* — Leydig, Voit & Mayer, Ltd.

(57) ABSTRACT

An operating method for a media stream transmission key includes: detecting, by a media gateway, lifetime status information of a media stream transmission key; and when the media gateway determines that a lifetime of the media stream transmission key expires, executing, by the media gateway, a media stream transmission key lifetime expiry behavior according to an instruction of a media gateway controller. The embodiments of the present invention fill a technical gap that an operation is performed on a lifetime status of a media stream transmission key in an architecture where an MG and an MGC are separated.

33 Claims, 3 Drawing Sheets

(56) References Cited

U.S. PATENT DOCUMENTS

| | | | | |
|---|---|---|---|---|
| 7,592,899 | B2 | 9/2009 | Holt et al. | |
| 8,011,012 | B2 * | 8/2011 | Carle et al. | 726/27 |
| 8,331,765 | B2 * | 12/2012 | Kwon et al. | 386/252 |
| 2005/0283607 | A1 | 12/2005 | Zhang et al. | |
| 2006/0236101 | A1 * | 10/2006 | Qiao et al. | 713/168 |
| 2007/0165858 | A1 | 7/2007 | Bakshi | |
| 2007/0198839 | A1 | 8/2007 | Carle et al. | |
| 2007/0280256 | A1 * | 12/2007 | Forslow | 370/395.2 |
| 2008/0186952 | A1 * | 8/2008 | Lin et al. | 370/352 |
| 2010/0008227 | A1 | 1/2010 | Szabo et al. | |
| 2011/0096929 | A1 | 4/2011 | Seleznev et al. | |

FOREIGN PATENT DOCUMENTS

| | | | |
|---|---|---|---|
| CN | 1571408 | A | 1/2005 |
| CN | 1581858 | A | 2/2005 |
| CN | 101009551 | A | 8/2007 |
| CN | 101513013 | A | 8/2009 |
| CN | 101567876 | A | 10/2009 |
| EP | 2 273 733 | A1 | 1/2001 |
| EP | 1667355 | A1 | 6/2006 |
| EP | 2273733 | A1 | 1/2011 |
| WO | 2009151277 | A2 | 12/2009 |

OTHER PUBLICATIONS

Baugher, M., et al., "The Secure Real-time Transport Protocol (SRTP)", Network Working Group, Request for Comments: 3711, Category: Standards Track, Mar. 2004, XP015009491, total 58 pages.

Cisco Systems, "Securing Internet Telephony Media with SRTP and SDP," Feb. 23, 2007, XP002528048, total 12 pages.

Editor H.248.SRTP, Initial draft of new ITU-T H.248.Srtp "Gateway Control Protocol: SRTP package and procedures," International Telecommunication Union, Telecommunication Standardization Sector, Study Period 2009-2012, Study Group 16, TD 266 (WP 2/16), Geneva, Oct. 26-Nov. 6, 2009, total 20 pages.

Extended European Search Report dated Oct. 16, 2012 in connection with European Patent Application No. 10845478.6, 6 pages.

Chomsky, et al.; "H.248.SRTP—Proposed initial draft for a new H.248 work item: SRTP Package and Procedures"; Telecommunication Standardization Sector; Oct. 2009, 12 pages.

Internet Citation; "Securing Internet Telephony Media wih SRTP and SDP"; XP-002528048; May 13, 2009; CISCO; 11 pages.

Baugher, et al.; The Secure Real-time Transport Protocol (SRTP); CISCO Systems, Inc. Network Working Group; Mar. 2004, 56 pages.

PCT Written Opinion of the International Searching Authority, dated (mailed) Nov. 18, 2010, in related Application No. PCT/CN2010/070637, Huawei Technologies Co., Ltd. et al. (4 pgs.).

English-language translation of International Search Report from the Chinese Patent Office in International Application No. PCT/CN2010/070637 dated Nov. 18, 2010.

International Telecommunication Union, Initial draft of new ITU-T H.248.SRTP "Gateway Control Protocol: SRTP package and procedures", Study Group 16 TD 266 (WP 2/16), pp. 1-20, (Oct. 26-Nov. 2009).

* cited by examiner

OPERATING METHOD, APPARATUS AND SYSTEM FOR MEDIA STREAM TRANSMISSION KEY

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application is *a Reissue Application of patent application Ser. No. 13/489,872, filed on Jun. 6, 2012, issued as U.S. Pat. No. 9,130,961 on Sep. 8, 2015, which is* a continuation of International Application No. PCT/CN2010/070637, filed on Feb. 11, 2010, which is hereby incorporated by reference in its entirety.

FIELD OF THE INVENTION

The present invention relates to the field of communications technologies, and in particular, to an operating method, apparatus and system for a media stream transmission key.

BACKGROUND OF THE INVENTION

In an architecture where bearer and control are separated, a gateway control protocol, for example, H.248, is usually adopted as a control protocol between a service layer control entity and a media plane execution entity. In this mechanism, the media plane execution entity includes a media gateway (Media Gateway, MG), and the service layer control entity includes a media gateway controller (Media Gateway Controller, MGC).

With wide application of an IP service, a security issue of data transmission on a network becomes more and more important. It can be seen from the perspective of a protocol that, security of the IP service mainly includes two aspects: One is security of a control plane and the other is security of a media plane.

The real-time transport protocol (Real-Time Transport Protocol, RTP), formulated by the Internet Engineering Task Force (Internet Engineering Task Force, IETF), is a protocol designed for multimedia data stream transmission. The RTP is responsible for multimedia data transmission, while the real-time transport control protocol (RTP Control Protocol, RTCP) provides functions such as quality of service monitoring, congestion control and media synchronization. The RTP provides a certain degree of confidentiality, and may encrypt an RTP payload. However, a default algorithm of the RTP is easy to be cracked. The IETF extends the RTP protocol, and puts forward the Secure Real-Time Transport Protocol (Secure Real-time Transport Protocol, SRTP). Usually, SRTP key information used in a session is negotiated through the Session initialization Protocol (Session Initiation Protocol, SIP), and key information is transmitted through interaction between the service layer control entity and the media plane execution entity. In this way, a security function of the media plane is implemented.

In a current network scenario, although receiving and using a media stream transmission key are supported at service and bearer layers, an operation cannot be performed on a lifetime status of the media stream transmission key.

SUMMARY OF THE INVENTION

Embodiments of the present invention provide an operating method, apparatus and system for a media stream transmission key, so as to solve a problem that an operation cannot be performed on a lifetime status of a media stream transmission key.

An embodiment of the present invention provides an operating method for a media stream transmission key, including:

detecting, by a media gateway, lifetime status information of a media stream transmission key; and when the media gateway determines that a lifetime of the media stream transmission key expires, executing, by the media gateway, a media stream transmission key lifetime expiry behavior according to an instruction of a media gateway controller.

An embodiment of the present invention further provides a media gateway, including a detecting module, a judging module and an operating module, where the detecting module is configured to detect lifetime status information of a media stream transmission key;

the judging module is configured to judge whether the lifetime of the media stream transmission key expires; and the operating module is configured to execute a media stream transmission key lifetime expiry behavior according to an instruction of a media gateway controller, when the judging module determines that a lifetime of the media stream transmission key expires.

An embodiment of the present invention further provides an operating system for a media stream transmission key, including a media gateway controller and a media gateway, where the media gateway controller is configured to send a key expiry event to the media gateway; and the media gateway is configured to receive the key expiry event that is sent by the media gateway controller, detect lifetime status information of a media stream transmission key according to the received key expiry event that is delivered by the media gateway controller; judge whether the lifetime of the media stream transmission key expires; and When it is determined that a lifetime of the media stream transmission key expires, execute a media stream transmission key lifetime expiry behavior according to an instruction of the media gateway controller.

In the embodiments of the present invention, when the media gateway determines that the lifetime of the media stream transmission key expires, the media gateway executes the media stream transmission key lifetime expiry behavior according to the instruction of the media gateway controller. The embodiments fill a technical gap that an operation is performed on a lifetime status of a media stream transmission key in an architecture where an MG and an MGC are separated.

BRIEF DESCRIPTION OF THE DRAWINGS

To describe the technical solutions in the embodiments of the present invention or in the prior art more clearly, the accompanying drawings required for describing the embodiments or the prior art are introduced briefly in the following. Apparently, the accompanying drawings in the following description are only some embodiments of the present invention, and persons of ordinary skill in the art may also derive other drawings from these accompanying drawings without creative efforts.

DETAILED DESCRIPTION OF THE EMBODIMENTS

The technical solutions in the embodiments of the present invention are clearly and fully described in the following with reference to the accompanying drawings in the embodiments of the present invention. Apparently, the embodiments to be described are only a part rather than all of the embodiments of the present invention. Based on the embodiments of the present invention, all other embodiments obtained by persons of ordinary skill in the art without creative efforts shall fall within the protection scope of the present invention.

In order to adapt to different application scenarios and enhance guard of a network against different potential security hazards, different keys are often deployed and applied in different time segments and fields. Therefore, a large number of different media stream transmission keys exist on the network. Each transmission key is corresponding to a different lifetime, and a lifetime determines generation time of a new key.

Figure 1:
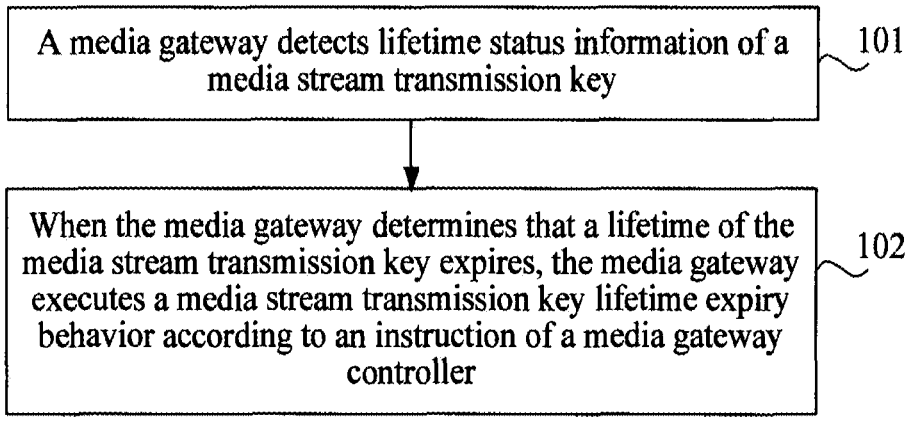
FIG. 1 is a flowchart of an operating method for a media stream transmission key according to an embodiment of the present invention.

FIG. 1 is a flowchart of an operating method for a media stream transmission key according to an embodiment of the present invention. As shown in FIG. 1, the method in this embodiment includes:

Step 101: A media gateway detects lifetime status information of a media stream transmission key.

For example, an MG may detect lifetime status information of a media stream transmission key according to a received key expiry event. The key expiry event is delivered by a media gateway controller to the media gateway, and definitely, may also be preset on the media gateway.

In a specific implementation process, in this embodiment, an event may be extended in an existing H.248 protocol-based feature pack or an extension feature pack. For example, the event may be named as a "key expiry (Key Expiry)" event, which is abbreviated as "ke". When the MG receives a key expiry event delivered by an MGC, the MG may be triggered to detect lifetime status information of a media stream transmission key.

Step 102: When the media gateway determines that a lifetime of the media stream transmission key expires, the media gateway executes a media stream transmission key lifetime expiry behavior according to an instruction of a media gateway controller.

For example, the media gateway detects lifetime status information of the media stream transmission key, and performs judgment on the detected lifetime status information of the media stream transmission key; when the media gateway determines that the lifetime of the media stream transmission key expires, the media gateway may execute the media stream transmission key lifetime expiry behavior according to the instruction of the media gateway controller.

For example, a condition for determining that the lifetime of the media stream transmission key expires may be: If the number of packets that are transmitted using the same media stream transmission key reaches the maximum number that is set for the media stream transmission key, and at this time, the media stream transmission key is still not updated, it may be determined that the lifetime of the media stream transmission key expires.

When the lifetime of the media stream transmission key expires, in order that the MGC instructs the MG to execute a corresponding media stream transmission key lifetime expiry behavior. In this embodiment, a parameter may be extended in the "key expiry" event. For example, the parameter may be named as a "key lifetime expiry behavior (Key Lifetime Expiry Behaviour)" parameter, which is abbreviated as "kleb", to instruct the MG to execute the corresponding media stream transmission key lifetime expiry behavior. When receiving a media stream transmission key lifetime expiry behavior parameter that is instructed by the MGC, the MG may execute the corresponding media stream transmission key lifetime expiry behavior when the media stream transmission key expires.

For example, a parameter type of the "key lifetime expiry behavior" parameter may be defined as an enumeration type (Enumeration), and possible values of the parameter include at least one of the following:

a media gateway autonomous behavior, that is, a media gateway determined action (MG determined action). At this time, the media gateway does not need to further ask for an instruction from the media gateway controller, and may determine a processing behavior independently. For example, a value of the parameter may be defined as 0×0001; or the media gateway closes a media stream and sends a media stream close message (for example, RTCP BYE). For example, a value of the parameter may be defined as 0×0002; or the media gateway reports a key expiry event to the media gateway controller, and does not send a media stream close message (for example, RTCP BYE). For example, a value of the parameter may be defined as 0×0003; or the media gateway reports a key expiry event to the media gateway controller, closes a media stream and sends a media stream close message (for example, RTCP BYE). For example, a value of the parameter may be defined as 0×0004.

In this embodiment, an object to which the media gateway sends the media stream close message is another network entity at a bearer layer, for example, user equipment (User Equipment, UE). The media gateway may send an RTCP BYE message to a network entity at a bearer lay at a peer end, so as to close a media stream on a bearer plane.

In this embodiment, the media gateway reports a key expiry event to the media gateway controller. That is, when the MG notifies the MGC through a gateway control protocol message, the message carries a key expiry event. In order that the MG may notify the MGC timely before the lifetime of the media stream transmission key expires, a key expiry instruction parameter may also be carried in a reported key expiry event, where whether a current media stream transmission key is still used is indicated through different values of the instruction parameter. For example, the instruction parameter may be defined as a Boolean type (Boolean). A value "On" indicates that the number of applied media stream packets of the current media stream transmission key reaches the maximum value of a key lifetime. That is, a lifetime of the current media stream transmission key expires. A value "Off" indicates that the number of applied media stream packets of the current media stream transmission key does not reach the maximum value of the key lifetime.

In this embodiment, when the key expiry event is delivered by the MGC to the MG, the "key lifetime expiry behavior" parameter may be carried in the key expiry event and delivered to the MG together; and definitely, the "key lifetime expiry behavior" parameter may also be delivered separately. When the key expiry event is preset on the media gateway, the MGC delivers the "key lifetime expiry behavior" parameter to the MG separately.

In this embodiment, when the media gateway determines that the lifetime of the media stream transmission key expires, the media gateway may execute the media stream transmission key lifetime expiry behavior according to the instruction of the media gateway controller. This embodiment fills a technical gap that an operation is performed on a lifetime status of a media stream transmission key in an architecture where the MG and the MGC are separated. Moreover, by detecting the lifetime status of the media stream transmission. key, secure transmission of a media stream may be implemented.

When a media stream is transmitted, usually one or more different transmission keys are involved, for example, a master key (Master Key) and a session key (Session Key) may be included. In this circumstance, the foregoing mechanism may be enhanced to implement lifetime expiry operations of different granularities.

In an operating method for a media stream transmission key according to another embodiment of the present invention, a key expiry "(Key Expiry)" event may be specific. For example, in order to implement detection of a master key, a specific "master key expiry (Master Key Expiry)" event may be defined, which is abbreviated as "mke". This embodiment may include the following steps.

201: When a media gateway receives a master key expiry "mke" event that is delivered by a media gateway controller, the media gateway may be triggered to detect lifetime status information of a media stream transmission master key.

202: When the media gateway determines that a lifetime of the media stream transmission master key expires, the media gateway executes a media stream transmission key lifetime expiry behavior according to an instruction of the media gateway controller.

For a specific judging condition, reference may be made to the description in the first embodiment.

For a specific method in which an MGC instructs an MG to execute a corresponding media stream transmission key lifetime expiry behavior, reference may be made to the description in the first embodiment.

In an operating method for a media stream transmission key according to another embodiment of the present invention, media stream transmission keys may be classified to implement lifetime expiry behaviors for different types of media stream transmission keys. For example, a "key type (Key Type)" parameter may be defined in the "key expiry" event, and is abbreviated as "kt", where a value of the parameter may include a master key and a session key, so as to implement detection of lifetime statuses for different types of media stream transmission keys. This embodiment may include the following steps.

301: When a media gateway receives a key expiry event including a key type "kt" parameter, where the key expiry event is delivered by a media gateway controller, the media gateway may be triggered to detect lifetime status information of a specified type of media stream transmission key.

302: When the media gateway determines that a lifetime of the specified type of media stream transmission key expires, the media gateway executes a media stream transmission key lifetime expiry behavior according to an instruction of the media gateway controller.

For a specific judging condition, reference may be made to the description in the first embodiment.

For a specific method in which an MGC instructs an MG to execute a corresponding media stream transmission key lifetime expiry behavior, reference may be made to the description in the first embodiment.

In an operating method for a media stream transmission key according to another embodiment of the present invention, a media stream transmission key may be identified to implement a lifetime expiry behavior for a specific media stream transmission key. For example, a "key identifier (Key Identifier)" parameter may be defined in the "key expiry" event and is abbreviated as "ki", where a value of the parameter may be a specific key. This embodiment may include the following steps.

401: When a media gateway receives a key expiry event including a key identifier "ki" parameter, where the key expiry event is delivered by a media gateway controller, the media gateway may be triggered to detect lifetime status information of a media stream transmission key with a specified identifier.

402: When the media gateway determines that a lifetime of the media stream transmission key with the specified identifier expires, the media gateway executes a media stream transmission key lifetime expiry behavior according to an instruction of the media gateway controller.

For a specific judging condition, reference may be made to the description in the first embodiment.

For a specific method in which an MGC instructs an MG to execute a corresponding media stream transmission key lifetime expiry behavior, reference may be made to the description in the first embodiment.

In the operating methods for a media stream transmission key according to the foregoing embodiments of the present invention, the key expiry "(Key Expiry)" event may be specific, media stream transmission keys may be classified, or a media stream transmission key may be identified. When the media gateway determines that a lifetime of a specific media stream transmission key, a lifetime of a specified type of media stream transmission key, or a lifetime of a media stream transmission key with a specified identifier expires, the media gateway executes a media stream transmission key lifetime expiry behavior according to the instruction of the media gateway controller. The foregoing embodiments of the present invention fill a technical gap that an operation is performed on a lifetime status of a media stream transmission key in an architecture where an MG and an MGC are separated. Moreover, by detecting the lifetime status of the media stream transmission key, secure transmission of a media stream may be implemented.

Figure 5:
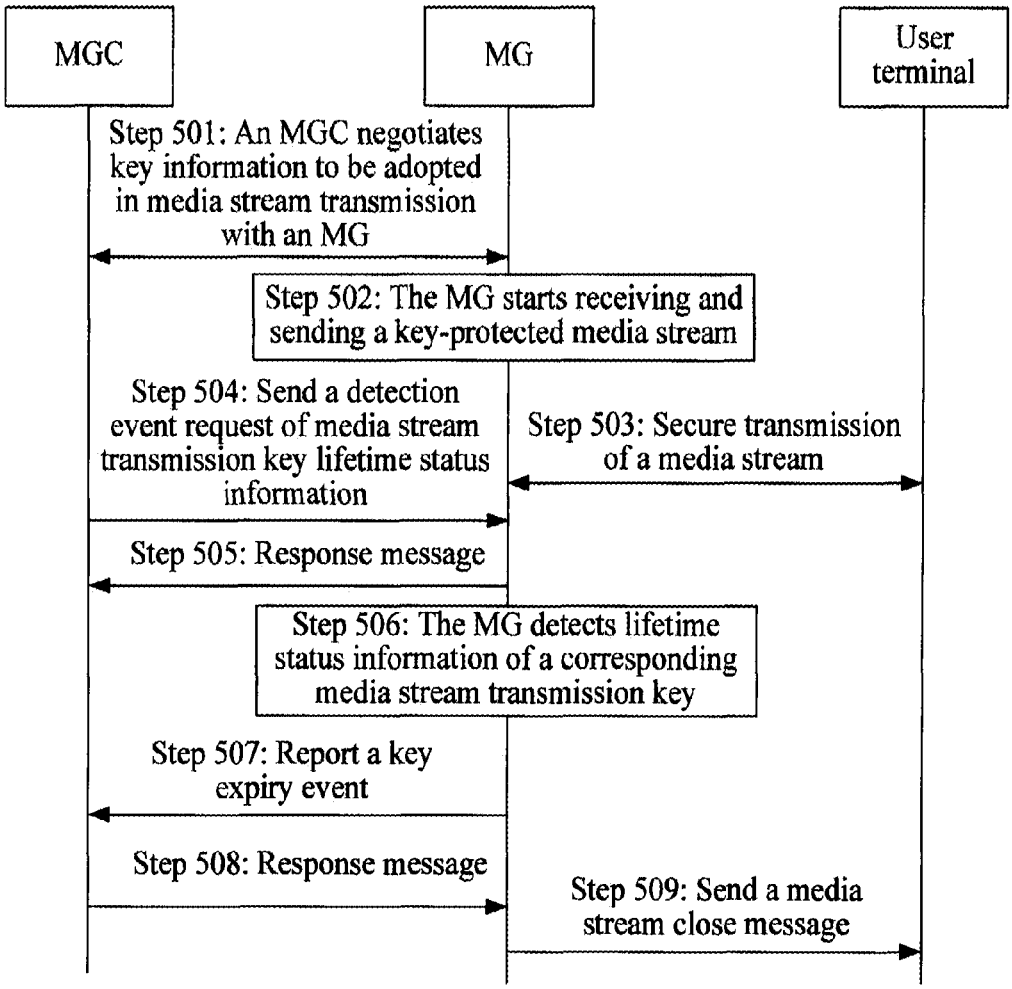
FIG. 5 is a signaling flowchart of a method according to an embodiment of the present invention.

FIG. 5 is a signaling flowchart of a method according to an embodiment of the present invention. As shown in FIG. 5, the method in this embodiment includes:

Step 501: An MGC negotiates key information to be adopted in media stream transmission with an MG. Here, the key information may be negotiated and determined by a service layer to which the MGC belongs, and may also be generated by the MGC based on a local policy and then indicated to the MG.

Step 502: The MG starts receiving and sending a key-protected media stream according to an instruction of the MGC, including encrypting a media stream to be sent, and decrypting a received media stream.

Step 503: Taking a user terminal as an example, the MG and the user terminal start secure transmission of a media stream.

Step 504: The MGC sends a detection event request of media stream transmission key lifetime status information to the MG, where a "key expiry (ke)" event is included, and the "key expiry (ke)" event carries a "key lifetime expiry behavior (kleb)" parameter. In this example, a value of the "key lifetime expiry behavior (kleb)" parameter is "0×0004". That is, when a lifetime of a media stream transmission key expires, a media gateway reports a key expiry event to a media gateway controller, closes a media stream and sends a media stream close message (for example, RTCP BYE).

Step 505: The MG sends a response message to the MGC.

Step 506: The MG detects lifetime status information of a corresponding media stream transmission key, and performs judgment on the detected lifetime status information of the media stream transmission key.

Step 507: When determining that a lifetime of the media stream transmission key expires, the MG executes a media stream transmission key lifetime expiry behavior according to an instruction of the MGC, which specifically includes: The MG reports a key expiry event to the MGC.

Step 508: The MGC sends a response message to the MG.

Step 509: The MG executes the media stream transmission key lifetime expiry behavior according to the instruction of the MGC, which specifically includes: The MG sends an RTCP BYE message to the user terminal and closes the media stream.

This embodiment fills a technical gap that an operation is performed on a lifetime status of a media stream transmission key in an architecture where an MG and an MGC are separated. Moreover, by detecting the lifetime status of the media stream transmission key, secure transmission of a media stream may be implemented.

The foregoing takes a media stream transmission key as an example. When multiple different transmission keys are involved, a key expiry "(Key Expiry)" event may be specific. For example, in order to detect a master key, a "master key expiry mke" event may be defined. Alternatively, media stream transmission keys may be classified to implement lifetime expiry behaviors of different types of media stream transmission keys. For example, a "key type kt" parameter may be defined in a "key expiry (ke)" event. Alternatively, a media stream transmission key may be identified to implement a lifetime expiry behavior of a specific media stream transmission key. For example, a "key identifier ki" parameter may be defined in the "key expiry (ke)" event, where a value of the parameter may be a specific key. Specific signaling flowcharts of the foregoing embodiments are not described in detail here.

An embodiment of the present invention further provides a schematic structural diagram of an operating apparatus for a media stream transmission key, which is described by taking a media gateway as an example.

Figure 6:
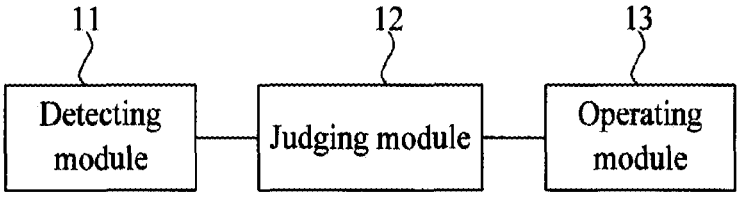
FIG. 6 is a schematic structural diagram of a media gateway according to an embodiment of the present invention.

FIG. 6 is a schematic structural diagram of a media gateway according to an embodiment of the present invention. As shown in FIG. 6, the media gateway in this embodiment includes: a detecting module 11, a judging module 12, and an operating module 13, where the detecting module 11 is configured to detect lifetime status information of a media stream transmission key; the judging module 12 is configured to judge whether the lifetime status information of the media stream transmission key expires; and the operating module 13 is configured to execute a media stream transmission key lifetime expiry behavior according to an instruction of a media gateway controller, when the judging module 12 determines that a lifetime of the media stream transmission key expires.

The media gateway in this embodiment is corresponding to the operating method for the media stream transmission key in the embodiment shown in FIG. 1, and a specific implementation principle is not described in detail here.

Figure 7:
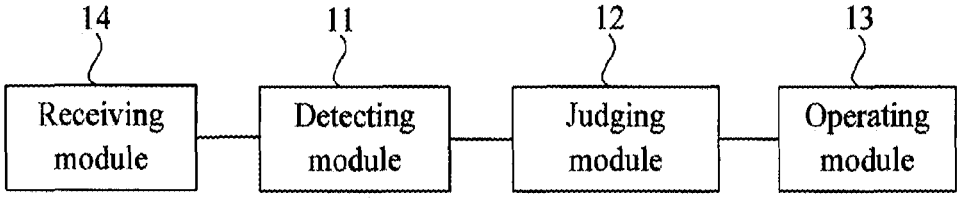
FIG. 7 is a schematic structural diagram of a media gateway according to another embodiment of the present invention.

FIG. 7 is a schematic structural diagram of a media gateway according to another embodiment of the present invention. As shown in FIG. 7, the media gateway in this embodiment includes: a detecting module 11, a judging module 12, and an operating module 13, and further includes: a receiving module 14, where the receiving module 14 is configured to receive a key expiry event that is delivered by a media gateway controller; the detecting module 11 is configured to detect lifetime status information of a media stream transmission key according to the key expiry event that is delivered by the media gateway controller and received by the receiving module 14; the judging module 12 is configured to judge whether the lifetime status information of the media stream transmission key expires; and the operating module 13 is configured to execute a media stream transmission key lifetime expiry behavior according to an instruction of the media gateway controller, when the judging module 12 determines that a lifetime of the media stream transmission key expires.

Optionally, the receiving module 14 is configured to receive a "master key expiry mke" event that is delivered by the media gateway controller, the detecting module 11 is configured to detect lifetime status information of a media stream transmission master key according to the master key expiry event that is delivered by the media gateway controller and received by the receiving module 14; the judging module 12 is configured to judge whether the lifetime status information of the media stream transmission master key expires; and the operating module 13 is configured to execute a media stream transmission key lifetime expiry behavior according to an instruction of the media gateway controller, when the judging module 12 determines that a lifetime of the media stream transmission master key expires.

Figure 2:
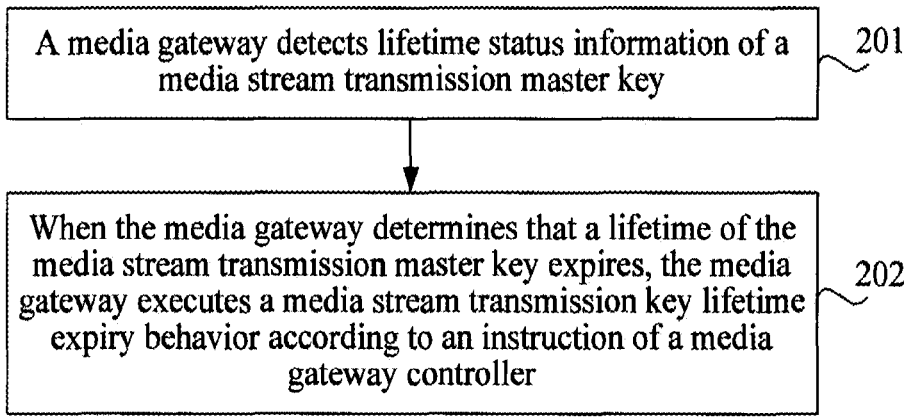
FIG. 2 is a flowchart of an operating method for a media stream transmission key according to another embodiment of the present invention.

The media gateway in this embodiment is corresponding to the operating method for the media stream transmission key in the embodiment shown in FIG. 2, and a specific implementation principle is not described in detail here.

Optionally, the receiving module 14 is further configured to receive a key expiry event including a key type "kt" parameter, where the key expiry event is delivered by the media gateway controller; the detecting module 11 is configured to detect lifetime status information of a specified type of media stream transmission key according to the key expiry event that is delivered by the media gateway controller and received by the receiving module 14; the judging module 12 is configured to judge whether the lifetime status information of the specified type of media stream transmission key expires; and the operating module 13 is configured to execute a media stream transmission key lifetime expiry behavior according to an instruction of the media gateway controller, when the judging module 12 determines that a lifetime of the specified type of media stream transmission key expires.

Figure 3:
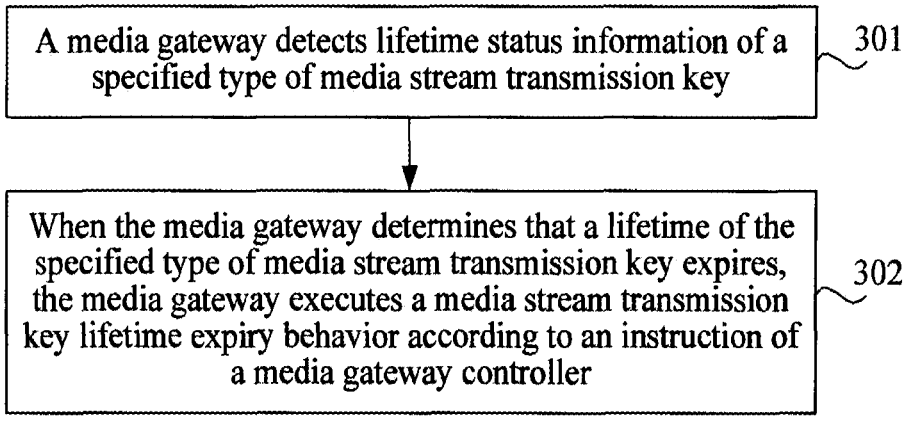
FIG. 3 is a flowchart of an operating method for a media stream transmission key according to another embodiment of the present invention.

The media gateway in this embodiment corresponds to the operating method for the media stream transmission key in the embodiment shown in FIG. 3, and a specific implementation principle is not described in detail here.

Optionally, the receiving module 14 is further configured to receive a key expiry event including a key identifier "ki" parameter, where the key expiry event is delivered by the media gateway controller; the detecting module 11 is configured to detect lifetime status information of a media stream transmission key with a specified identifier according to the key expiry event that is delivered by the media gateway controller and received by the receiving module 14; the judging module 12 is configured to judge whether the lifetime status information of the media stream transmission key with the specified identifier expires; and the operating module 13 is configured to execute a media stream transmission key lifetime expiry behavior according to an instruction of the media gateway controller, when the judging module 12 determines that a lifetime of the media stream transmission key with the specified identifier expires.

Figure 4:
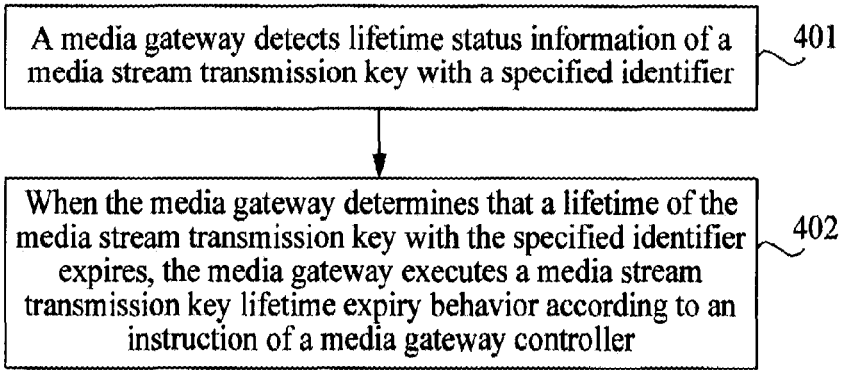
FIG. 4 is a flowchart of an operating method for a media stream transmission key according to another embodiment of the present invention.

The media gateway in this embodiment corresponds to the operating method for the media stream transmission key in the embodiment shown in FIG. 4, and a specific implementation principle is not described in detail here.

Optionally, the receiving module 14 is further configured to receive a key expiry event including a "key lifetime expiry behavior (Key Lifetime Expiry Behaviour)" parameter, where the key expiry event is delivered by the media gateway controller; the operating module 13 is configured to execute a media stream transmission key lifetime expiry behavior according to an instruction of the "key lifetime expiry behavior (Key Lifetime Expiry Behaviour)" parameter delivered by the media gateway controller, when the judging module 12 determines that a lifetime of the media stream transmission key expires.

Specifically, a parameter type of the "key lifetime expiry behavior" parameter may be defined as an enumeration type (Enumeration), and possible values of the parameter include at least one of the following:

a media gateway autonomous behavior, that is, a media gateway determined action (MG determined action), at this time, the media gateway does not need to further ask for an instruction from the media gateway controller, and may determine a processing behavior independently. For example, a value of the parameter may be defined as 0×0001; or the media gateway closes a media stream and sends a media stream close message (for example, RTCP BYE). For example, a value of the parameter may be defined as 0×0002; or the media gateway reports a key expiry event to the media gateway controller, and does not send a media stream close message (for example, RTCP BYE). For example, a value of the parameter may be defined as 0×0003; or the media gateway reports a key expiry event to the media gateway controller, closes a media stream and sends a media stream close message (for example, RTCP BYE). For example, a value of the parameter may be defined as 0×0004.

In the foregoing media gateway embodiments, when the judging module determines that the lifetime of the media stream transmission key expires, the operating module may execute the media stream transmission key lifetime expiry behavior according to the instruction of the media gateway controller. This embodiment fills a technical gap that an operation is performed on a lifetime status of a media stream transmission key in an architecture where an MG and an MGC are separated. Moreover, by detecting the lifetime status of the media stream transmission key, secure transmission of a media stream may be implemented.

Figure 8:
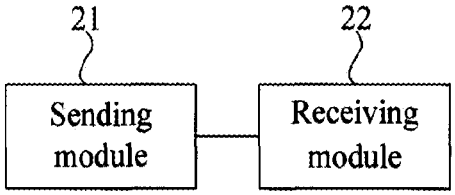
FIG. 8 is a schematic structural diagram of a media gateway controller according to an embodiment of the present invention.

FIG. 8 is a schematic structural diagram of a media gateway controller according to an embodiment of the present invention. As shown in FIG. 8, the media gateway controller in this embodiment includes: a sending module 21, where the sending module 21 is configured to deliver a key expiry event to a media gateway, so that the media gateway detects lifetime status information of a media stream transmission key according to the key expiry event.

Optionally, the sending module 21 is configured to deliver a "master key expiry mke" event to the media gateway.

Optionally, the sending module 21 is configured to deliver a key expiry event including a key type "kt" parameter to the media gateway.

Optionally, the sending module 21 is configured to deliver a key expiry event including a key identifier "ki" parameter to the media gateway.

Optionally, the sending module 21 is configured to deliver a key expiry event including a "key lifetime expiry behavior (Key Lifetime Expiry Behaviour)" parameter to the media gateway. When the "key lifetime expiry behavior (Key Lifetime Expiry Behaviour)" parameter includes a key expiry event that is reported by the media gateway to the media gateway controller, the media gateway controller further includes a receiving module 22, configured to receive the key expiry event that is reported by the media gateway.

The media gateway controller in this embodiment is corresponding to the operating method embodiments of the media stream transmission key, and a specific implementation principle is not described in detail here.

Figure 9:
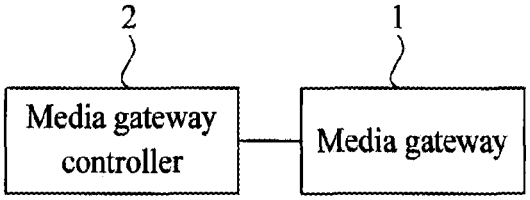
FIG. 9 is a schematic structural diagram of an operating system for a media stream transmission key according to an embodiment of the present invention.

FIG. 9 is a schematic structural diagram of an operating system for a media stream transmission key. As show in FIG. 9, the operating system for a media stream transmission key in this embodiment includes: a media gateway controller 2 and a media gateway 1, where the media gateway controller 2 is configured to send a key expiry event to the media gateway 1; and the media gateway 1 is configured to receive the key expiry event that is sent by the media gateway controller 2, detect lifetime status information of a media stream transmission key according to the received key expiry event that is delivered by the media gateway controller, judge whether the lifetime status information of the media stream transmission key expires, and execute a media stream transmission key lifetime expiry behavior according to an instruction of the media gateway controller, when determining that a lifetime of the media stream transmission key expires.

The foregoing system embodiment is corresponding to the operating method embodiments of the media stream transmission key, and a specific implementation principle is not described in detail here.

The foregoing system embodiment fills a technical gap that an operation is performed on a lifetime status of a media stream transmission key in an architecture where an MG and an MGC are separated. Moreover, by detecting the lifetime status of the media stream transmission key, secure transmission of a media stream may be implemented.

Finally, it should be noted that the forgoing embodiments are merely used for describing the technical solutions of the present invention, but are not intended to limit the present invention. It should be understood by persons of ordinary skill in the art that although the present invention has been described in detail with reference to exemplary embodiments, modifications or equivalent replacements may still be made to the technical solutions of the present invention, however, these modifications or equivalent replacements cannot make the modified technical solutions depart from the spirit and scope of the technical solutions of the present invention.

What is claimed is:

1. An operating method for a media stream transmission key, comprising:

receiving, by a media gateway, a key expiry event including a key lifetime expiry behavior parameter delivered by a media gateway controller, wherein the key lifetime expiry behavior parameter instructs the media gateway to execute, when the media stream transmission key expires, a corresponding key lifetime expiry behavior;

detecting, by the media gateway, lifetime status information of [a] *the* media stream transmission key according to the received key expiry event; and when the media gateway determines that a lifetime of the media stream transmission key expires, executing, by the media gateway, the key lifetime expiry behavior corresponding to the key lifetime expiry behavior parameter delivered by the media gateway controller;

wherein the key lifetime expiry behavior corresponding to the key lifetime expiry behavior parameter comprises at least one of the following:

closing a media stream and sending a media stream close message, or reporting the key expiry event to the media gateway controller, without sending a media stream close message, wherein the reported key expiry event carries a key expiry indication parameter which indicates whether or not the media stream transmission key is still used.

2. The method according to claim 1, wherein the key expiry event comprises a key type parameter, and the media gateway detects lifetime status information of the media stream transmission key of a specified type according to the key expiry event comprising the key type parameter; when the media gateway determines that a lifetime of the media stream transmission key of the specified type expires, the media gateway executes the key lifetime expiry behavior corresponding to the key lifetime expiry behavior parameter of the media gateway controller.

3. The method according to claim 1, wherein the key expiry event comprises a key identifier parameter, and the media gateway detects lifetime status information of [a] *the* media stream transmission key with a specified identifier according to the key expiry event comprising the key identifier parameter; when the media gateway determines that a lifetime of the media stream transmission key with the specified identifier expires, the media gateway executes the key lifetime expiry behavior corresponding to the key lifetime expiry behavior parameter of the media gateway controller.

4. The method according to claim 1, wherein the key expiry event is a master key expiry event, and the media gateway detects lifetime status information of a media stream transmission master key according to the received master key expiry event; when the media gateway determines that a lifetime of the media stream transmission master key expires, the media gateway executes the key lifetime expiry behavior corresponding to the key lifetime expiry behavior parameter of the media gateway controller.

5. The method according to claim 1, wherein a condition for determining that a lifetime of the media stream transmission key expires is that, the number of packets that are transmitted by using the media stream transmission key reaches a maximum number that is set for the media stream transmission key.

[6. A media gateway, comprising a receiving module, a detecting module, a judging module and an operating module, wherein the receiving module is configured to receive a key expiry event including a key lifetime expiry behavior parameter that are delivered by a media gateway controller, wherein the key lifetime expiry behavior parameter instructs the media gateway to execute, when the media stream transmission key expires, a corresponding key lifetime expiry behavior;

the detecting module is configured to detect lifetime status information of a media stream transmission key according to the key expiry event that is delivered by the media gateway controller and received by the receiving module;

the judging module is configured to judge whether the lifetime of the media stream transmission key expires; and the operating module is configured to execute the key lifetime expiry behavior corresponding to the key lifetime expiry behavior parameter delivered by a media gateway controller, when the judging module determines that the lifetime of the media stream transmission key expires;

wherein the key lifetime expiry behavior corresponding to the key lifetime expiry behavior parameter comprises at least one of the following:

closing a media stream and sending a media stream close message, or reporting the key expiry event to the media gateway controller, without sending a media stream close message, wherein the reported key expiry event carries a key expiry indication parameter which indicates whether or not the media stream transmission key is still used.]

[7. The media gateway according to claim 6, wherein the receiving module is further configured to receive a key expiry event comprising a key type parameter;

the detecting module is configured to detect lifetime status information of media stream transmission key of a specified type according to the key expiry event that is delivered by the media gateway controller and received by the receiving module;

the judging module is configured to judge whether the lifetime status information of media stream transmission key of the specified type expires; and the operating module is configured to execute the media stream transmission key lifetime expiry behavior corresponding to the key lifetime expiry behavior parameter of the media gateway controller, when the judging module determines that a lifetime of media stream transmission key of the specified type expires.]

8. An operating system for a media stream transmission key, comprising a media gateway controller and a media gateway, wherein *the media gateway controller comprising a memory and a processor, and when executable program code stored in the memory is executed by the processor,* the media gateway controller is [configured] *caused* to send a key expiry event including a key lifetime expiry behavior parameter to the media gateway, wherein the key lifetime expiry behavior parameter instructs the media gateway to execute, when the media stream transmission key expires, a corresponding key lifetime expiry behavior; and

*wherein the media gateway comprising a memory and a processor, and when executable program code stored in the memory is executed by the processor,* the media gateway is [configured] *caused* to receive the key expiry event and the key lifetime expiry behavior parameter sent by the media gateway controller; according to the received key expiry event that is delivered by the media gateway controller, detect lifetime status information of [a] *the* media stream transmission key; judge whether the lifetime of the media stream transmission key expires; and when determining that the lifetime of the media stream transmission key expires, execute the key lifetime expiry behavior corresponding to the key lifetime expiry behavior parameter sent by the media gateway controller; wherein the key lifetime expiry behavior corresponding to the key lifetime expiry behavior parameter comprises at least one of the following: closing a media stream and sending a media stream close message, or reporting the key expiry event to the media gateway controller, without sending a media stream close message, wherein the reported key expiry event carries a key expiry indication parameter which indicates whether or not the media stream transmission key is still used.

[9. The media gateway according to claim 6, wherein the receiving module is further configured to receive a key expiry event comprising a key identifier parameter;

the detecting module is configured to detect lifetime status information of a media stream transmission key with a specified identifier according to the key expiry event that is delivered by the media gateway controller and received by the receiving module;

the judging module is configured to judge whether the lifetime status information of the media stream transmission key with the specified identifier expires; and the operating module is configured to execute the key lifetime expiry behavior corresponding to the key lifetime expiry behavior parameter of the media gateway controller, when the judging module determines that a lifetime of the media stream transmission key with the specified identifier expires.]

[10. The media gateway according to claim 6, wherein the receiving module is further configured to receive a master key expiry event;

the detecting module is configured to detect lifetime status information of a media stream transmission master key according to the master key expiry event;

the judging module is configured to judge whether the lifetime status information of the media stream transmission master key expires; and the operating module is configured to execute the key lifetime expiry behavior corresponding to the key lifetime expiry behavior parameter of the media gateway controller, when the judging module determines that a lifetime of the media stream transmission master key expires.]

[11. The media gateway according to claim 6, wherein a condition for determining that a lifetime of the media stream transmission key expires is that, the number of packets that are transmitted by using the media stream transmission key reaches a maximum number that is set for the media stream transmission key.]

12. The system according to claim 8, wherein the key expiry event comprises a key type parameter;

the media gateway is [configured] *caused* to detect lifetime status information of the media stream transmission key of a specified type according to the key expiry event comprising the key type parameter; when determining that a lifetime of the media stream transmission key of the specified type expires, to execute the key lifetime expiry behavior corresponding to the key lifetime expiry behavior parameter of the media gateway controller.

13. The system according to claim 8, wherein the key expiry event comprises a key identifier parameter;

the media gateway is [configured] *caused* to detect lifetime status information of [a] *the* media stream transmission key with a specified identifier according to the key expiry event comprising the key identifier parameter; when determining that a lifetime of the media stream transmission key with the specified identifier expires, to execute the key lifetime expiry behavior corresponding to the key lifetime expiry behavior parameter of the media gateway controller.

14. The system according to claim 8, wherein the key expiry event is a master key expiry event, and the media gateway is [configured] *caused* to detect lifetime status information of a media stream transmission master key according to the received master key expiry event; when determining that a lifetime of the media stream transmission master key expires, to execute the key lifetime expiry behavior corresponding to the key lifetime expiry behavior parameter of the media gateway controller.

15. The system according to claim 8, wherein a condition for determining that a lifetime of the media stream transmission key expires is that, the number of packets that are transmitted by using the media stream transmission key reaches a maximum number that is set for the media stream transmission key.

*16. An operating method for a media stream transmission key, comprising:*

*receiving, by a media gateway, a key expiry event and a key lifetime expiry behavior parameter delivered by a media gateway controller, wherein the key lifetime expiry behavior parameter instructs the media gateway to execute, when the media stream transmission key expires, a corresponding key lifetime expiry behavior;*

*detecting, by the media gateway, lifetime status information of the media stream transmission key according to the received key expiry event; and*

*when the media gateway determines that a lifetime of the media stream transmission key expires, executing, by the media gateway, the key lifetime expiry behavior corresponding to the key lifetime expiry behavior parameter;*

*wherein the key lifetime expiry behavior corresponding to the key lifetime expiry behavior parameter comprises at least one of the following:*

*closing a media stream and sending a media stream close message, or reporting the key expiry event to the media*

*gateway controller, without sending a media stream close message, wherein the reported key expiry event carries a key expiry indication parameter which indicates whether or not the media stream transmission key is still used.*

*17. The method according to claim 16, wherein the key expiry event comprises a key type parameter, and the media gateway detects lifetime status information of the media stream transmission key of a specified type according to the key expiry event comprising the key type parameter;*

*when the media gateway determines that the lifetime of the media stream transmission key of the specified type expires, the media gateway executes the key lifetime expiry behavior corresponding to the key lifetime expiry behavior parameter of the media gateway controller.*

*18. The method according to claim 16, wherein the key expiry event comprises a key identifier parameter, and the media gateway detects lifetime status information of the media stream transmission key with a specified identifier according to the key expiry event comprising the key identifier parameter; when the media gateway determines that the lifetime of the media stream transmission key with the specified identifier expires, the media gateway executes the key lifetime expiry behavior corresponding to the key lifetime expiry behavior parameter of the media gateway controller.*

*19. The method according to claim 16, wherein the key expiry event is a master key expiry event, and the media gateway detects lifetime status information of a media stream transmission master key according to the received master key expiry event; when the media gateway determines that a lifetime of the media stream transmission master key expires, the media gateway executes the key lifetime expiry behavior corresponding to the key lifetime expiry behavior parameter of the media gateway controller.*

*20. The method according to claim 16, wherein a condition for determining that the lifetime of the media stream transmission key expires is that, the number of packets that are transmitted by using the media stream transmission key reaches a maximum number that is set for the media stream transmission key.*

*21. A media gateway, comprising a memory and a processor, and when executable program code stored in the memory is executed by the processor, the media gateway is caused to:*

*receive a key expiry event and a key lifetime expiry behavior parameter that are delivered by a media gateway controller, wherein the key lifetime expiry behavior parameter instructs the media gateway to execute, when a media stream transmission key expires, a corresponding key lifetime expiry behavior;*

*detect lifetime status information of the media stream transmission key according to the key expiry event that is delivered by the media gateway controller and received by the receiving module;*

*judge whether a lifetime of the media stream transmission key expires; and*

*execute the key lifetime expiry behavior corresponding to the key lifetime expiry behavior parameter delivered by a media gateway controller, when the lifetime of the media stream transmission key expires;*

*wherein the key lifetime expiry behavior corresponding to the key lifetime expiry behavior parameter comprises at least one of the following:*

*closing a media stream and sending a media stream close message, or reporting the key expiry event to the media gateway controller, without sending a media stream close message, wherein the reported key expiry event carries a key expiry indication parameter which indicates whether or not the media stream transmission key is still used.*

*22. The media gateway according to claim 21, wherein the media gateway is further caused to:*

*receive a key expiry event comprising a key type parameter;*

*detect lifetime status information of the media stream transmission key of a specified type according to the key expiry event that is delivered by the media gateway controller;*

*judge whether the lifetime status information of the media stream transmission key of the specified type expires; and*

*execute the media stream transmission key lifetime expiry behavior corresponding to the key lifetime expiry behavior parameter of the media gateway controller, when the lifetime of the media stream transmission key of the specified type expires.*

*23. The media gateway according to claim 21, wherein media gateway is further caused to:*

*receive a key expiry event comprising a key identifier parameter;*

*detect lifetime status information of the media stream transmission key with a specified identifier according to the key expiry event that is delivered by the media gateway controller;*

*judge whether the lifetime status information of the media stream transmission key with the specified identifier expires; and*

*execute the key lifetime expiry behavior corresponding to the key lifetime expiry behavior parameter of the media gateway controller, when the lifetime of the media stream transmission key with the specified identifier expires.*

*24. The media gateway according to claim 21, wherein the media gateway is further caused to:*

*receive a master key expiry event;*

*detect lifetime status information of a media stream transmission master key according to the master key expiry event;*

*judge whether the lifetime status information of the media stream transmission master key expires; and*

*execute the key lifetime expiry behavior corresponding to the key lifetime expiry behavior parameter of the media gateway controller, when a lifetime of the media stream transmission master key expires.*

*25. The media gateway according to claim 21, wherein a condition for determining that the lifetime of the media stream transmission key expires is that, the number of packets that are transmitted by using the media stream transmission key reaches a maximum number that is set for the media stream transmission key.*

*26. An operating system for a media stream transmission key, comprising a media gateway controller and a media gateway,*

*wherein the media gateway controller comprising a memory and a processor, and when executable program code stored in the memory is executed by the processor, the media gateway controller is caused to*

*send a key expiry event and a key lifetime expiry behavior parameter to the media gateway, wherein the key lifetime expiry behavior parameter instructs the media*

*gateway to execute, when the media stream transmission key expires, a corresponding key lifetime expiry behavior; and*

*wherein the media gateway comprising a memory and a processor, and when executable program code stored in the memory is executed by the processor, the media gateway is caused to:*

*receive the key expiry event and the key lifetime expiry behavior parameter sent by the media gateway controller; according to the received key expiry event that is delivered by the media gateway controller, detect lifetime status information of the media stream transmission key; judge whether a lifetime of the media stream transmission key expires; and when determining that the lifetime of the media stream transmission key expires, execute the key lifetime expiry behavior corresponding to the key lifetime expiry behavior parameter;*

*wherein the key lifetime expiry behavior corresponding to the key lifetime expiry behavior parameter comprises at least one of the following:*

*closing a media stream and sending a media stream close message, or reporting the key expiry event to the media gateway controller, without sending a media stream close message, wherein the reported key expiry event carries a key expiry indication parameter which indicates whether or not the media stream transmission key is still used.*

*27. The system according to claim 26, wherein the key expiry event comprises a key type parameter;*

*the media gateway is caused to detect lifetime status information of the media stream transmission key of a specified type according to the key expiry event comprising the key type parameter, when determining that the lifetime of the media stream transmission key of the specified type expires, to execute the key lifetime expiry behavior corresponding to the key lifetime expiry behavior parameter of the media gateway controller.*

*28. The system according to claim 26, wherein the key expiry event comprises a key identifier parameter;*

*the media gateway is caused to detect lifetime status information of the media stream transmission key with a specified identifier according to the key expiry event comprising the key identifier parameter; when determining that the lifetime of the media stream transmission key with the specified identifier expires, to execute the key lifetime expiry behavior corresponding to the key lifetime expiry behavior parameter of the media gateway controller.*

*29. The system according to claim 26, wherein the key expiry event is a master key expiry event, and the media gateway is caused to detect lifetime status information of a media stream transmission master key according to the received master key expiry event; when determining that a lifetime of the media stream transmission master key expires, to execute the key lifetime expiry behavior corresponding to the key lifetime expiry behavior parameter of the media gateway controller.*

*30. The system according to claim 26, wherein a condition for determining that the lifetime of the media stream transmission key expires is that, the number of packets that are transmitted by using the media stream transmission key reaches a maximum number that is set for the media stream transmission key.*

*31. An operating method for a media stream transmission key, comprising:*

*sending, by a media gateway controller, a key expiry event including a key lifetime expiry behavior parameter to a media gateway, wherein the key lifetime expiry behavior parameter is used to instruct the media gateway to execute, when the media stream transmission key expires, a corresponding key lifetime expiry behavior;*

*receiving, by the media gateway, the key expiry event from the media gateway controller;*

*detecting, by the media gateway, lifetime status information of the media stream transmission key according to the received key expiry event; and*

*when the media gateway determines that a lifetime of the media stream transmission key expires, executing, by the media gateway, the key lifetime expiry behavior corresponding to the key lifetime expiry behavior parameter delivered by the media gateway controller;*

*wherein the key lifetime expiry behavior corresponding to the key lifetime expiry behavior parameter comprises: closing a media stream and sending a media stream close message.*

*32. The method according to claim 31, wherein the key expiry event is a master key expiry event, and the media gateway detects lifetime status information of a media stream transmission master key according to the received master key expiry event; when the media gateway determines that a lifetime of the media stream transmission master key expires, the media gateway executes the key lifetime expiry behavior corresponding to the key lifetime expiry behavior parameter of the media gateway controller.*

*33. The method according to claim 31, wherein a condition for determining that a lifetime of the media stream transmission key expires is that, the number of packets that are transmitted by using the media stream transmission key reaches a maximum number that is set for the media stream transmission key.*

*34. The method according to claim 31, further comprising:*

*reporting, by the media gateway, the key expiry event to the media gateway controller after the media gateway determines that the lifetime of the media stream transmission key expires.*

*35. An operating method for a media stream transmission key, comprising:*

*sending, by a media gateway controller, a key expiry event and a key lifetime expiry behavior parameter to a media gateway, wherein the key lifetime expiry behavior parameter is used to instruct the media gateway to execute, when the media stream transmission key expires, a corresponding key lifetime expiry behavior;*

*receiving, by the media gateway, the key expiry event and the key lifetime expiry behavior parameter from the media gateway controller;*

*detecting, by the media gateway, lifetime status information of the media stream transmission key according to the received key expiry event; and*

*when the media gateway determines that a lifetime of the media stream transmission key expires, executing, by the media gateway, the key lifetime expiry behavior corresponding to the key lifetime expiry behavior parameter;*

*wherein the key lifetime expiry behavior corresponding to the key lifetime expiry behavior parameter comprises:*

*closing a media stream and sending a media stream close message.*

*36. The method according to claim 35, wherein the key expiry event is a master key expiry event, and the media gateway detects lifetime status information of a media*

*stream transmission master key according to the received master key expiry event; when the media gateway determines that a lifetime of the media stream transmission master key expires, the media gateway executes the key lifetime expiry behavior corresponding to the key lifetime expiry behavior parameter of the media gateway controller.*

*37. The method according to claim 35, wherein a condition for determining that the lifetime of the media stream transmission key expires is that, the number of packets that are transmitted by using the media stream transmission key reaches a maximum number that is set for the media stream transmission key.*

*38. The method according to claim 35, further comprising:*

*reporting, by the media gateway, the key expiry event to the media gateway controller after the media gateway determines that the lifetime of the media stream transmission key expires.*

* * * * *